J. E. JONES.
FENDER.
APPLICATION FILED FEB. 2, 1915.
1,148,091.
Patented July 27, 1915.
3 SHEETS—SHEET 1.
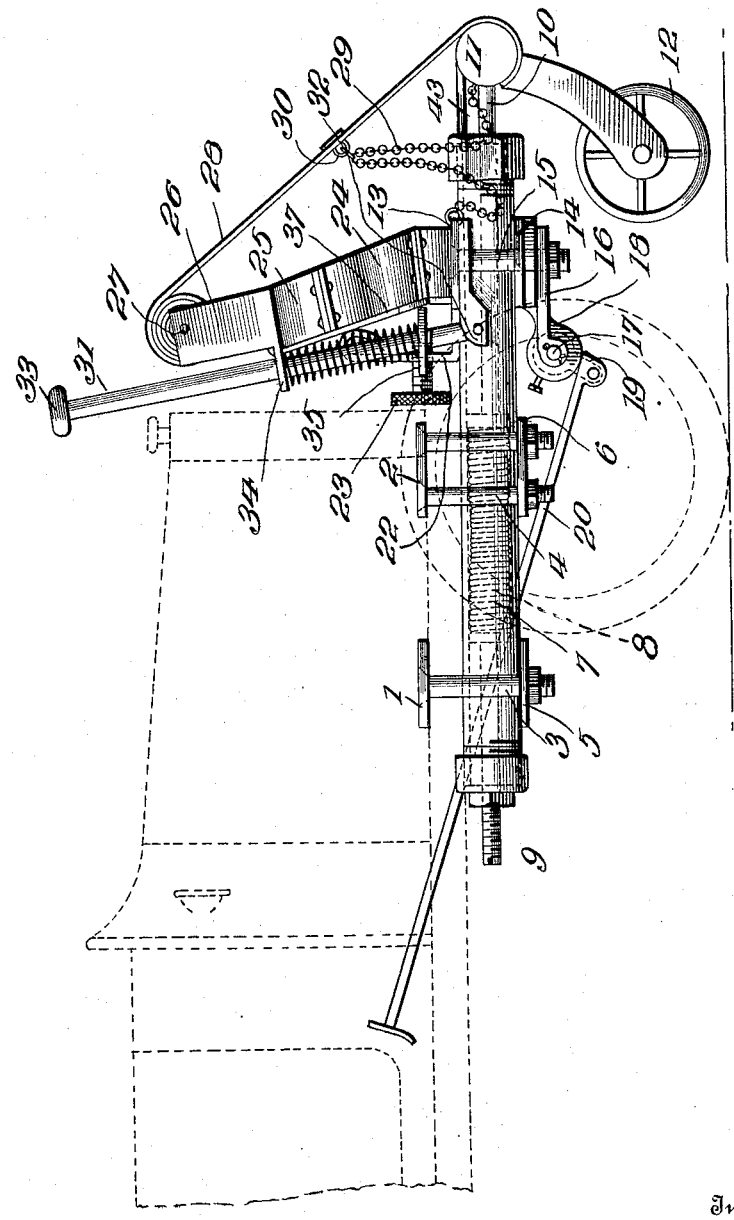
Witnesses
R. V. Bishop
Inventor
J. E. Jones.
By
Attorneys

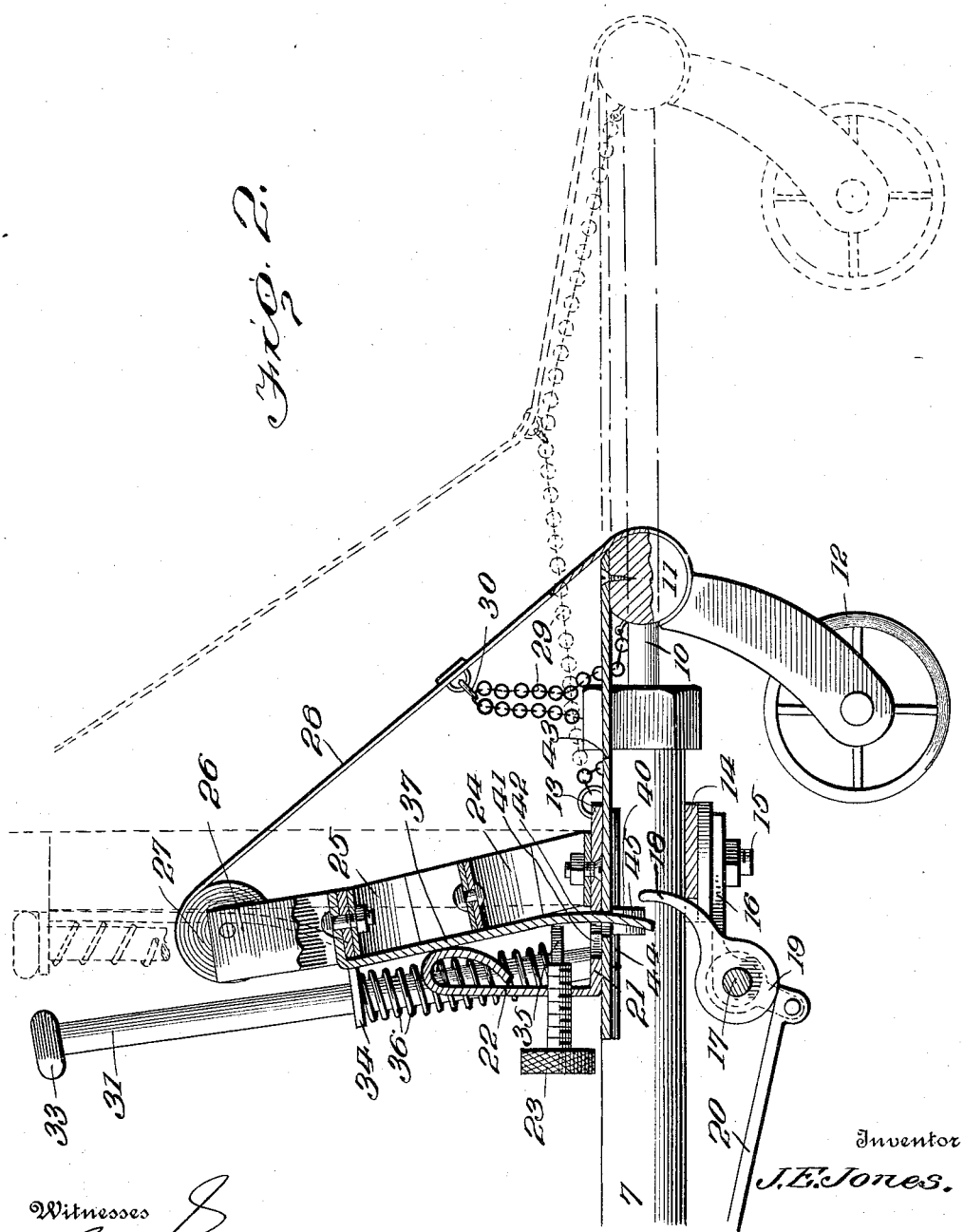

J. E. JONES.
FENDER.
APPLICATION FILED FEB. 2, 1915.
1,148,091.
Patented July 27, 1915.
3 SHEETS—SHEET 3.
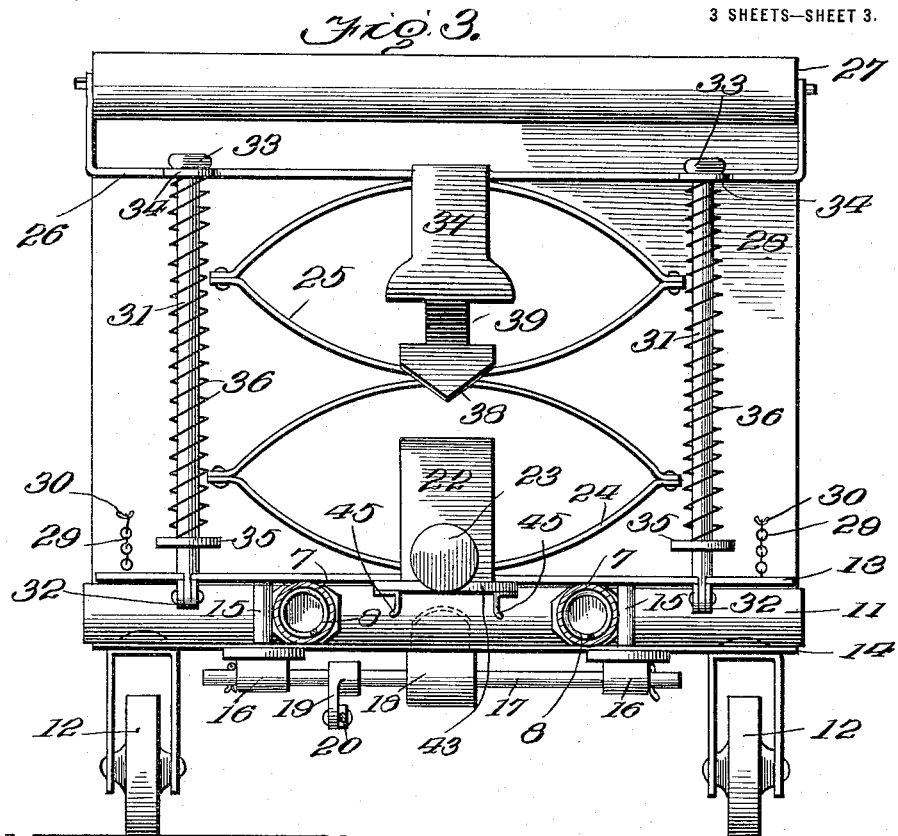
Inventor
J. E. Jones.
Witnesses
R. W. Bishop
By
Attorneys

UNITED STATES PATENT OFFICE.

JOHN E. JONES, OF THROOP, PENNSYLVANIA.

FENDER.

1,148,091. Specification of Letters Patent. Patented July 27, 1915.

Application filed February 2, 1915. Serial No. 5,706.

*To all whom it may concern:*

Be it known that I, JOHN E. JONES, a citizen of the United States, residing at Throop, in the county of Lackawanna and State of Pennsylvania, have invented certain new and useful Improvements in Fenders, of which the following is a specification.

This invention relates to fenders, and has for its object the provision of a fender which may be readily applied to an automobile or other vehicle and which will be automatically operated when striking a person or other object so as to catch the body of the person or other object and support the same until the vehicle can be stopped.

One object of the invention is to provide a fender which may be actuated by the occupant of the vehicle or released automatically by the impact of the body which is struck. Another object of the invention is to provide means whereby, when the vehicle is not in use, the fender will be locked in a retracted position so that it will not require a large amount of storage space, and a further object of the invention is to provide a fender in which the body-receiving member will be extended when the fender is operated to catch and support the body.

Other objects of the invention will appear as the description of the same proceeds, and the invention resides in certain novel features which will be hereinafter first fully described and then more particularly pointed out in the appended claims.

In the accompanying drawings, which fully illustrate what I now believe to be the best embodiment of the invention: Figure 1 is a side elevation of my improved fender, illustrating the same in position upon an automobile; Fig. 2 is a central longitudinal vertical section showing the fender retracted in full lines and projected in dotted lines; Fig. 3 is a rear elevation of the fender with parts in section and showing the same in its projected position; Fig. 4 is a detail perspective view of parts of the fender in unassembled relation.

In carrying out my invention, I secure to the vehicle frame cross bars 1 and 2 from which depend bolts 3 and 4, respectively, said bolts supporting additional cross bars or supporting plates 5 and 6. The cross bars 2 and 6 are arranged near the front end of the vehicle, the front axle of which may sometimes carry the cross bar 6, and the said cross bars or supporting plates 5 and 6 support cylinders 7 which are disposed at opposite sides of the longitudinal center of the vehicle and project forwardly beyond the front end of the same, as clearly shown in the drawings. Within the said cylinders are housed coiled springs 8 and in the rear ends of the cylinders are mounted tension screws 9 which are connected to the rear ends of the springs in any convenient or preferred manner so that, by turning the screws, the tension of the springs may be adjusted to any desired degree. Piston rods 10 are slidably mounted in the front ends of the cylinders, and the inner ends of said piston rods are equipped with heads bearing against the springs 8 so that, when the fender is free to operate, the said springs will expand and force the said heads to the front ends of the respective cylinders. A fender bar 11 is carried by the front ends of the piston rods 10, and the said bar is preferably equal in length to the width of the vehicle, caster wheels 12 being mounted upon the said bar near the ends of the same so that, if the weight imposed upon the fender should be abnormal, the said wheels will contact with the ground and sustain the fender so as to prevent injury to the same.

A cross bar 13 is secured upon the cylinders adjacent the front ends of the same and bridges the space between them, the ends of said cross bar projecting beyond the cylinders, as shown in Fig. 3. A co-acting cross bar 14 is clamped to the cylinders by means of bolts 15 inserted through the bars 13 and 14, as shown, and upon the lower ends of the said bolts are mounted brackets 16, the rear ends of which constitute bearings for a rock shaft 17 extending across the machine parallel with the said cross bars. The said rock shaft is equipped at its center with a trigger 18 which projects forwardly and upwardly from the rock shaft, as shown most clearly in Fig. 2, and, at an intermediate point of its length, the said rock shaft is provided with a crank 19 to which is pivoted the front end of an operating rod 20 extending upwardly and rearwardly into the vehicle where it may be conveniently operated by the foot of the chauffeur or other occupant.

The cross bar 13 is provided at its center with a rear extension 21 from which rises a standard 22 in which is mounted a lock screw or bolt 23, the purpose of which will presently appear. Secured upon the said cross bar 13 is the lower member of an elliptical spring 24, and a second elliptical spring 25 is secured upon the said spring 24 and over the same, as shown in Figs. 2 and 3. A yoke or U-shaped frame 26 is secured upon the upper spring 25, and in the up-turned ends of the said yoke or U-shaped frame is mounted a spring roller 27 to which is secured the upper end of the fender apron 28, the said apron being constructed of heavy canvas, leather or other suitable flexible material. The lower end of the said apron 28 is secured to the fender bar 11, and a chain or similar flexible retaining device 29 has its ends secured to the said fender bar and to the cross bar 13, respectively, while its intermediate portion passes through an eye or other guide 30 carried by the apron, it being understood, of course, that one of said chains is provided at each side of the fender, as shown in Fig. 3. Guide rods or standards 31 are pivoted at their lower ends to brackets 32 secured to the cross bar 13, and the said guide rods or standards have their upper ends equipped with knobs or similar stop devices 33, the intermediate portions of the said rods passing through rearwardly extending guides or lugs 34 on the yoke or frame 26, as shown. Near the lower ends of the said rods or standards are collars or annular flanges 35, and springs 36 are coiled around the said rods between the said collars or flanges and the lugs 34 so that, when the frame is released, the springs will expand and raise the same, the pivotal mounting of the standards permitting them to swing forwardly so as to accommodate the shifting in position of the parts in the operation of the fender.

Depending from the rear edge of the frame 26, at the center of the same, is a latch 37 having its lower extremity tapered, as shown at 38, and provided with notches 39 in its side edges immediately above the said tapered extremity whereby the latch is given an arrow-head form. The lower extremity of the latch is also slightly curved, as shown most clearly in Fig. 2 at 40, so that it may be readily engaged and shifted rearwardly by the trigger 18 when the rock shaft 17 is actuated. The central rear extension 21 of the cross bar 13 is provided with a longitudinal slot 41 and a notch 42 in the front edge or wall of said slot, as shown most clearly in Fig. 4, whereby it may constitute a keeper, while a keeper or trip plate 43 is secured to the fender bar 11 and projects rearwardly from the center of the same under the cross bar 13 and is provided near its rear end with a transverse slot 44 which is adapted at times to register with the slot 41 in the extension 21. Guards 45 are provided on the underside of the keeper plate 43 at the end of the slot 44 so as to facilitate the engagement of the latch with the keeper plate and the release of the latch from the keeper plate in the operation of the device.

The construction and arrangement of the several parts of my improved fender having thus been made known, it is thought the operation and advantages of the same will be readily understood and appreciated.

In the normal position of the several parts, the fender bar 11 is close to the front ends of the cylinders 7, and the frame 26 is lowered and held in its lowered position by the engagement of the latch with the keeper and the trip plate, the springs 24, 25 and 36 being compressed, as well as the springs in the cylinders 7. In arranging the fender in the retracted position, the fender bar 11 is pushed rearwardly so that the trip plate 43 will move sufficiently under the cross bar 3 to bring the slot 44 directly below the slot 41 and, while the parts are held in this position, the frame 26 is lowered so that the lower end of the latch 37 will pass through the said registering slots. If the fender bar be now permitted to yield to the action of the springs 8 in the cylinders 7, said bar with the trip plate 43 and the lower end of the latch will be moved forwardly and the latch will thus be brought into engagement with the keeper notch 42, the notches 39 in the side edges of the latch permitting the necessary slight forward movement of the latch, and engaging the edges of the keeper so as to prevent vertical movement of the latch.

If it is desired to lock the fender against release, as, for instance, when the automobile is in the garage, the locking screw or bolt 23 is turned forward until its front extremity bears against the latch, thereby preventing rearward movement of the latch and, consequently, retaining it in its lowered position through the engagement of the notches 39 and 42. If the vehicle is to be used, the locking screw or bolt 23 is retracted, as shown in Fig. 2. If the chauffeur observes a person in the path of the vehicle, he may project the fender by pressing forward upon the operating rod 20 thereby oscillating the rock shaft 17 and throwing the trigger 18 rearwardly against the lower end of the latch and forcing the latch rearwardly so that the lower end of the same will be in alinement with the slot 41. The instant the latch is moved from the notch 42, the several springs will expand and the latch will be drawn upwardly from the path of the trip plate 43 so that the fender bar will then move forwardly to the position indicated in dotted lines in Fig. 2. At the same time, the yoke 26 is raised to the position shown in Fig. 3, and the apron 28 is consequently extended so as to present a large surface to receive the impact of the person should the vehicle fail to stop before striking him. Inasmuch as the fender bar 11 moves outwardly at the same time that the roller 27 is moved upwardly and the apron 28 thereby extended, the flexible retainers 29 will be drawn more or less taut and will re-act upon the apron so as to impart a dished or convex appearance thereto and, consequently, provide a seat in which the person may drop without injury. When the parts are returned to their normal positions shown in Fig. 2, the spring roller 27 will automatically retract the fender apron, so that it will resume its taut position shown in full lines in the drawings.

It will be readily understood, of course, that it is not necessary for the chauffeur to release the latch through manipulation of the trigger 18, although such operation is preferred, as the fender will then be projected before striking the person and the shock to the person will be reduced. If from any cause the fender should not be projected through the manipulation of the trigger 18 and the fender bar 11 should strike the person in the path of the vehicle, the impact of said bar against the person would move the bar rearwardly to the extent necessary to shift the lower end of the latch out of the notch 42, whereupon the springs will at once project the fender so that the person struck will be taken up.

It will be readily noted that the latch has a slight movement longitudinally of the fender and the vehicle, and this longitudinal movement of the latch is, of course, imparted to the yoke 26 which is rigid and preferably integral with the latch. As a result of this movement, when the latch is in the holding position, indicated in Figs. 1 and 2, the springs 24 and 25 will be put under a slight torsional strain, as well as compressed, so that the yoke 26 will assume a position in rear of the vertical plane of the lower end or side of the spring 24. When the latch is released and moves upwardly, the springs 24 and 25 tend to come into alinement within a vertical plane and the apron 28 also exerts a forward pull upon the yoke 26 and the spring roller 27, the result being that the parts assume the position shown in dotted lines in Fig. 2.

My improved fender is obviously very compact in the arrangement of its parts and may be readily applied to any vehicle.

Having thus described the invention, what is claimed as new is:

1. A fender comprising a fender bar, a spring roller supported above the bar, an apron having one end secured to the roller and its other end secured to the bar, means for holding the fender bar and the roller in a normally retracted position, means for releasing the holding means, means for projecting the fender bar and the roller when the holding means is released, and a flexible retainer having one end fixed and its opposite end carried by the fender bar and having a slidable connection intermediate its ends with the apron.

2. A fender comprising a fender bar, a trip plate carried by said fender bar, a frame disposed above the fender bar, a latch carried by said frame and adapted to engage the trip plate to retain said frame in a lowered position, means for raising the frame when the latch is released from the trip plate, means for projecting the fender bar when the latch is released, and an apron carried by the fender bar and the said frame.

3. A fender comprising a fender bar, a trip plate carried by the fender bar, a frame disposed above the fender bar, a latch carried by said frame and adapted to engage said trip plate, means for raising said frame when the latch is released from the trip plate, means for projecting the fender bar when the latch is released, an apron carried by the fender bar and said frame, and means for locking the latch against release.

4. A fender comprising a fender bar, a trip plate carried by said bar, a frame disposed above the fender bar, a latch carried by said frame and adapted to engage the trip plate, means for raising said frame and projecting the fender bar when the latch is released from the trip plate, an apron carried by said frame and the fender bar, and a trigger arranged to engage the latch and release the same from the trip plate.

5. A fender comprising a support having a transverse slot and a notch in the forward wall of said slot, a fender bar, a trip plate projecting from the fender bar under the said support and having a transverse slot adapted to register with the slot in the support or with the notch therein, a frame disposed above the support, a latch depending from said frame and adapted to pass through the slots in the support and the trip plate and engaging the notch in the support, springs disposed between the support and the said frame and adapted to raise the frame when the latch is released, means for projecting the fender bar when the latch is so released, and an apron carried by the fender bar and the said frame.

6. A fender comprising a support, guides pivoted to and rising from said support, a frame mounted above the support and engaging said guides, a latch carried by the said frame, a fender bar, a trip carried by the fender bar and projecting under the support to be engaged by said latch, an apron carried by said frame and said fender bar, and springs acting upon the said frame to lift the same when the latch is released.

7. A fender comprising a support, a fender bar, a trip projecting from the fender bar under the support, a frame disposed above the support, guides pivotally attached to the support and rising therefrom, stops at the upper ends of said guides, said guides being engaged between their ends by the said frame, shoulders upon said guides near their lower ends, springs coiled around the guides above said shoulders and bearing against the frame, and a latch carried by the said frame and normally engaging the trip and the support to retain the frame in a lowered position against the action of the said springs.

8. A fender comprising a support, a fender bar, a frame disposed above the fender bar, a latch depending from said frame, a trip carried by the fender bar and adapted to be engaged by said latch, means for projecting the fender bar when the latch is released, means for raising said frame when the latch is released, an apron carried by said frame and the fender bar, a rock shaft below the trip, a trigger carried by the rock shaft and adapted to release the latch from the trip, and means for actuating said rock shaft.

9. A fender comprising a support, a keeper on the support, a fender bar, a trip carried by the fender bar and extending under the keeper, a fender apron secured to and extending upward from the fender bar, a support for the upper end of said apron, a latch on said support adapted to engage the keeper and be engaged by said trip, and means for projecting the fender bar and raising the apron support when the latch is released from the keeper.

In testimony whereof I affix my signature in presence of two witnesses.

JOHN E. JONES. [L. s.]

Witnesses:
KARL S. RAYMONDE,
WM. G. PERRY.

Copies of this patent may be obtained for five cents each, by addressing the "Commissioner of Patents, Washington, D. C."